(12) United States Patent
Oomori

(10) Patent No.: US 8,325,231 B2
(45) Date of Patent: Dec. 4, 2012

(54) MONITORING APPARATUS WITH AN INDICATOR INDICATING THE OPERATING STATE THEREOF

(75) Inventor: Takayoshi Oomori, Kanagawa (JP)

(73) Assignee: Sony Corporation, Tokyo (JP)

( * ) Notice: Subject to any disclaimer, the term of this patent is extended or adjusted under 35 U.S.C. 154(b) by 52 days.

(21) Appl. No.: 12/903,362

(22) Filed: Oct. 13, 2010

(65) Prior Publication Data

US 2011/0090350 A1 Apr. 21, 2011

(30) Foreign Application Priority Data

Oct. 21, 2009 (JP) ............................... P2009-242703

(51) Int. Cl.
*H04N 7/18* (2006.01)
(52) U.S. Cl. ........................................ 348/143; 348/151
(58) Field of Classification Search .................. 348/143, 348/144, 151, 152
See application file for complete search history.

(56) References Cited

U.S. PATENT DOCUMENTS

| 6,992,723 | B1 * | 1/2006 | Wulf et al. ..................... 348/374 |
| 2004/0145658 | A1 * | 7/2004 | Lev-Ran et al. ............... 348/143 |
| 2008/0012980 | A1 * | 1/2008 | Yamane et al. ............... 348/373 |
| 2008/0136909 | A1 * | 6/2008 | Berkey .......................... 348/143 |

FOREIGN PATENT DOCUMENTS

JP 2005 311826 11/2005

* cited by examiner

*Primary Examiner* — Kelly L Jerabek
(74) *Attorney, Agent, or Firm* — Frommer Lawrence & Haug LLP; William S. Frommer; Ellen Marcie Emas

(57) ABSTRACT

There is provided a monitoring apparatus including a front cover, an imaging device that is accommodated in the front cover and captures a subject image, a rear cover to be fixed onto a mounting surface on which the apparatus is mounted, and an emitting unit that emits light toward the mounting surface, where a light-emitting state of the light emitted by the emitting unit is associated with an operation state of the apparatus.

6 Claims, 5 Drawing Sheets

MONITORING APPARATUS WITH AN INDICATOR INDICATING THE OPERATING STATE THEREOF

BACKGROUND OF THE INVENTION

1. Field of the Invention

The present invention relates to a monitoring apparatus.

2. Description of the Related Art

As a related art, a monitoring camera is proposed as a monitoring apparatus that is placed on a ceiling or the like of a building or a room and that monitors surroundings of the building or the inside of the room (see JP 2005-311826 A, for example).

It is necessary for installation personnel or the like of such a monitoring camera to grasp the operation state of the monitoring camera and to verify whether the monitoring camera is operating normally after installing the monitoring camera.

The monitoring camera changes a light-emitting state of the light-emitting diode (LED), which is placed on a board inside the body, in association with an operation state of the monitoring camera, for example. This allows the installation personnel or the like of the monitoring camera to grasp the operation state of the monitoring camera based on the light-emitting state of the LED.

SUMMARY OF THE INVENTION

Incidentally, it is not preferable to place the above LED in a position that is visible from outside, because its light-emitting state is associated with the operation state of the monitoring camera. For this reason, the above LED is generally placed inside the body of the monitoring camera.

However, in a case where the LED is placed inside the body of the monitoring camera, in verifying the operation state of the monitoring camera, it is necessary for the installation personnel or the like of the monitoring camera to remove the body front cover of the monitoring camera and verify the light-emitting state of the LED. There is an issue that it is troublesome for the installation personnel or the like to remove the body front cover every time the operation state of the monitoring camera is to be verified.

There also exists an issue that the cost of the body of the monitoring camera increases when a light guide tube is used in order to allow the light-emitting state of the LED placed inside the body of the monitoring camera to be verified from outside of the monitoring camera.

Furthermore, there was an issue that the design of the body of the monitoring camera was disfigured when a peephole for verification of the light-emitting state of the LED was formed on the body front cover of the monitoring camera in order to allow the light-emitting state of the LED placed inside the body of the monitoring camera to be verified from outside of the monitoring camera.

In light of the foregoing, it is desirable to provide a novel and improved monitoring apparatus, with an inexpensive structure, that allows a caretaker or the like to easily grasp the operation state of the apparatus, without disfiguring the design of the apparatus.

According to an embodiment of the present invention, there is provided a monitoring apparatus including a front cover, an imaging device that is accommodated in the front cover and captures a subject image, a rear cover to be fixed onto a mounting surface on which the apparatus is mounted, and an emitting unit that emits light toward the mounting surface, where a light-emitting state of the light emitted by the emitting unit is associated with an operation state of the apparatus.

The light emitted by the emitting unit may be emitted to the mounting surface through a vent hole that is formed in a gap between the front cover and the rear cover.

The periphery of the rear cover may be located within the side of the front cover.

The monitoring apparatus may further include another emitting unit that emits light toward the mounting surface.

The light emitted by such other emitting unit may be emitted to the mounting surface through another vent hole that is formed in a gap between the front cover and the rear cover.

The hole diameter of the vent hole and the hole diameter of such other vent hole may have different sizes.

As described above, according to the embodiments of the present invention, it is possible to allow a caretaker or the like to easily grasp the operation state of the apparatus, by providing the apparatus having an inexpensive structure and whose design is not disfigured.

DETAILED DESCRIPTION OF THE EMBODIMENT(S)

Figure 1:
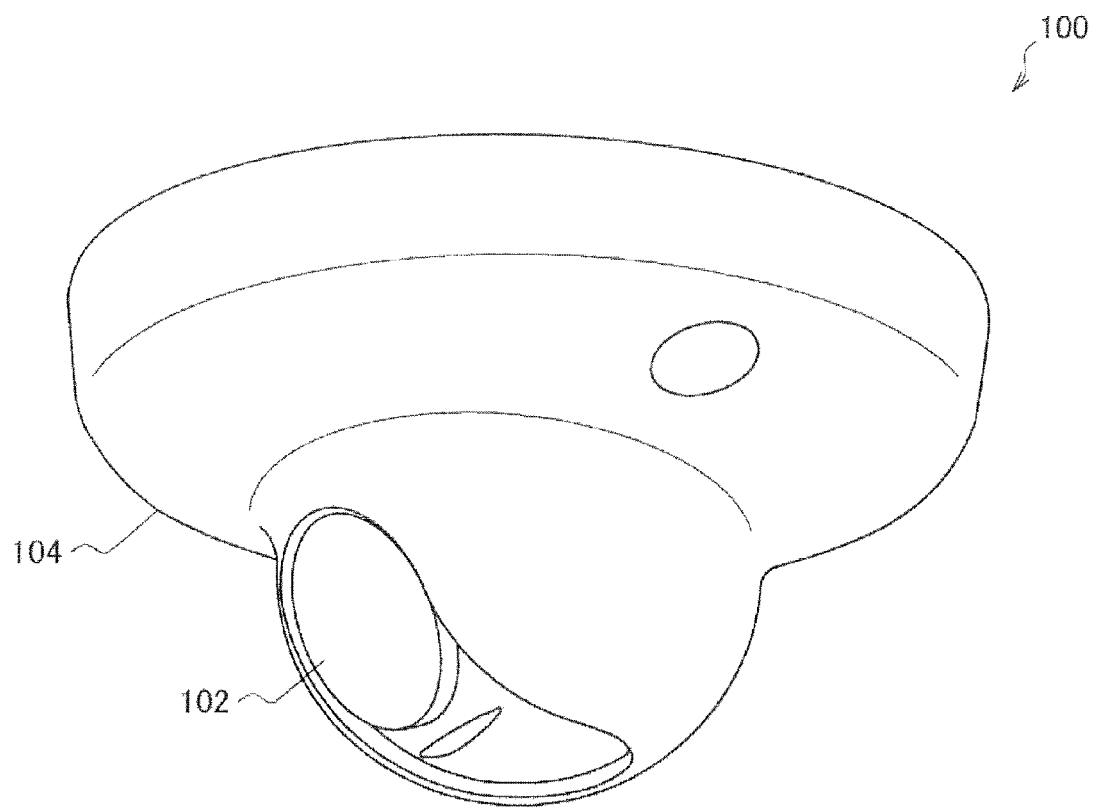
FIG. 1 is a perspective view illustrating an outer appearance of a monitoring camera viewed obliquely from below according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
1. Outer appearance example of monitoring camera (first embodiment)
2. Configuration example of monitoring camera (first embodiment)
3. Another configuration example of monitoring camera (second embodiment)

[Outer Appearance Example of Monitoring Camera]

Figure 2:
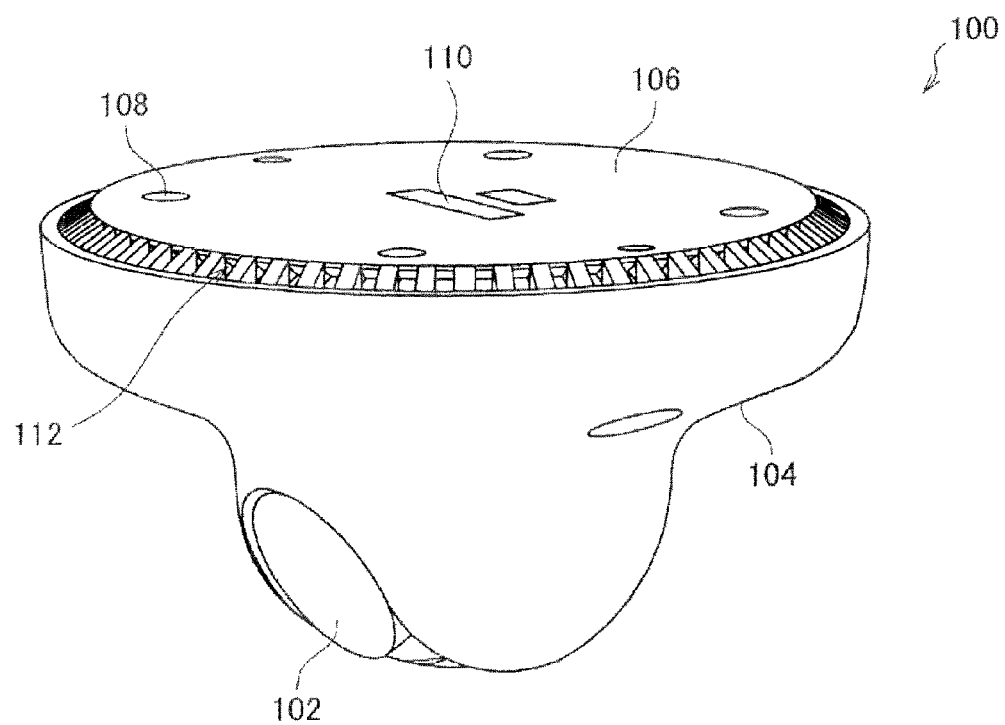
FIG. 2 is a perspective view illustrating the outer appearance of the monitoring camera viewed obliquely from above according to the first embodiment of the present invention.

First, an outer appearance example of a monitoring camera according to a first embodiment will be explained. FIG. 1 is a perspective view illustrating the outer appearance of the monitoring camera viewed obliquely from below according to the first embodiment of the present invention. FIG. 2 is a perspective view illustrating the outer appearance of the monitoring camera viewed obliquely from above according to the first embodiment of the present invention.

In FIG. 1 and FIG. 2, a monitoring camera 100 is shown as an example of the monitoring apparatus according to the first embodiment of the present invention, and includes mainly a camera module 102, a body front cover 104, and a body rear cover 106.

The camera module 102 has an imaging element (not shown), and captures a subject image to generate an image signal. The body front cover 104 is in the shape of a two-tier dome and accommodates the camera module 102. The body rear cover 106 is in the shape of an annular plate and has a plurality of screw inserting holes 108 and a cable inserting hole 110 formed thereon. Furthermore, a board (not shown) is accommodated in an internal space that is defined by the body front cover 104 and the body rear cover 106.

Furthermore, as shown in FIG. 2, a plurality of vent holes 112 that open in oblique directions are formed in a gap between the body front cover 104 and the body rear cover 106.

The monitoring camera 100 according to the first embodiment of the present invention is placed on a ceiling or the like of a building or a room and can capture still images or moving images in order to monitor or observe surroundings of the building or subjects in the room.

[Configuration Example of Monitoring Camera]

Figure 3:
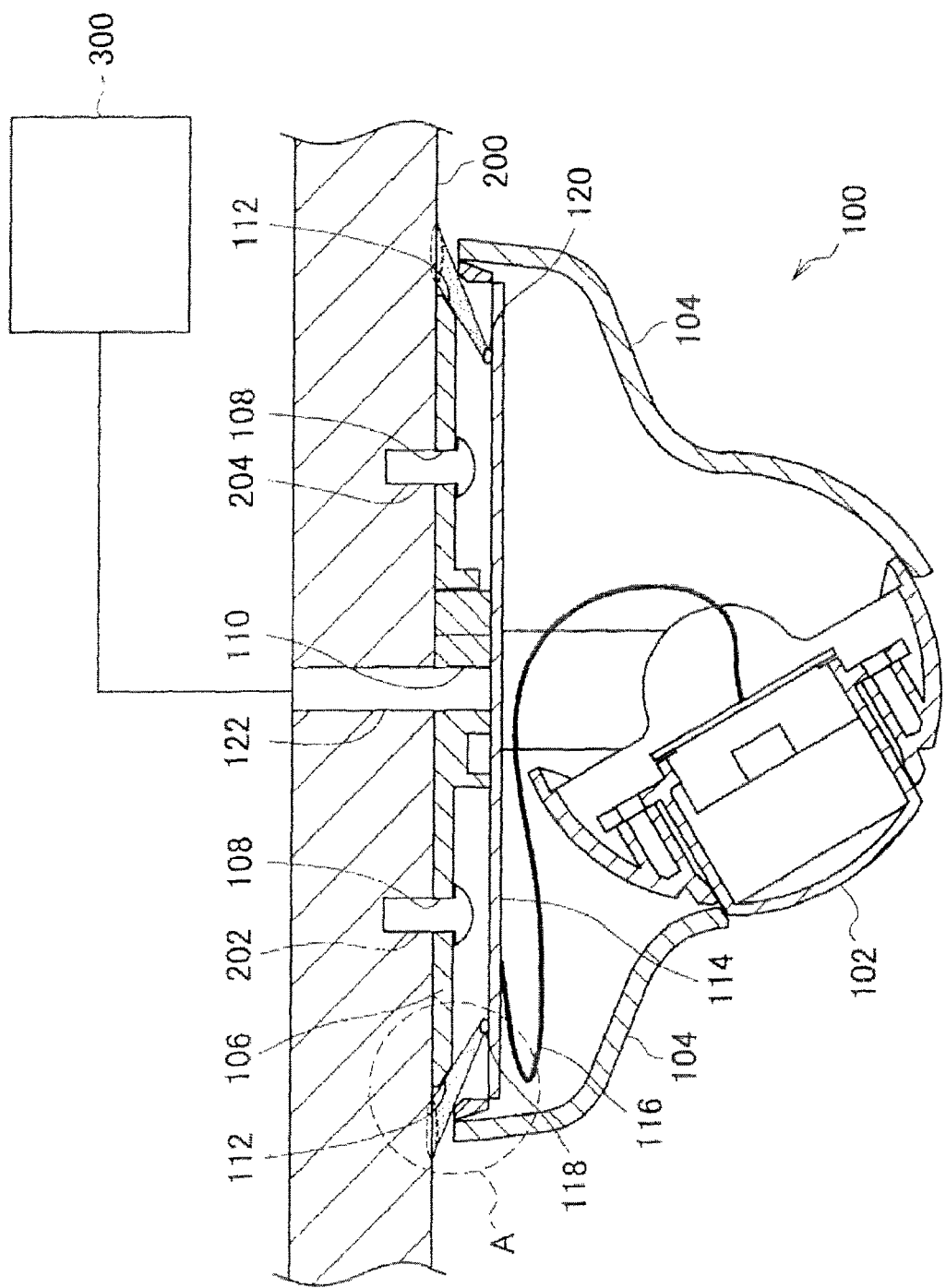
FIG. 3 is a cross-sectional view illustrating a schematic configuration of the monitoring camera according to the first embodiment of the present invention.

Next, a configuration example of a monitoring camera according to the first embodiment of the present invention will be explained. FIG. 3 is a cross-sectional view illustrating a schematic configuration of the monitoring camera according to the first embodiment of the present invention.

In FIG. 3, the monitoring camera 100 is placed on a ceiling 200 in a room, for example. The monitoring camera 100 includes mainly a camera module 102 as an imaging device, a body front cover 104, a body rear cover 106, a board 114, a cable 116, and LEDs 118, 120. The LEDs 118, 120 are shown as an example of the emitting unit of the present embodiment. Further, the periphery of the body rear cover 106 is located within the side of the body front cover 104. The camera module 102 and the board 114 are connected with each other via the cable 116.

The board 114 is substantially disc-shaped and is disposed in an internal space defined by the body front cover 104 and the body rear cover 106, in parallel to the body rear cover 106. The board 114, in which a plurality of electronic parts is mounted on the printed board, constitutes a major part of the control system of the monitoring camera 100.

The LEDs 118, 120 are placed in proximity to the edges on the board 114 and their light-emitting states are controlled by being associated with the operation state of the monitoring camera 100. For example, the LED 118 is in a turn-on state when the power supply of the monitoring camera 100 is in an on-state, and is in a turn-off state when the power supply of the monitoring camera 100 is in an off-state. Furthermore, for example, the LED 120 is in a turn-on state when the network connection state of the monitoring camera 100 is in a connected-state, and is in a turn-off state when the network connection state of the network connection state of the monitoring camera 100 is in an unconnected-state.

Figure 4:
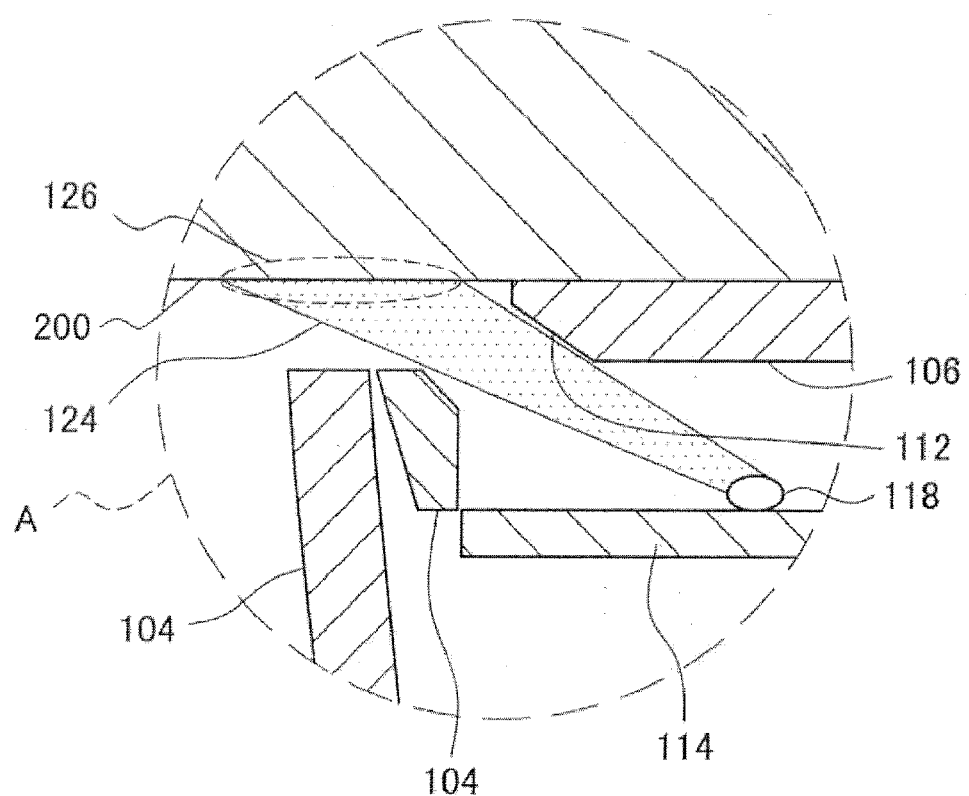
FIG. 4 is an enlarged view of section A in FIG. 3.

FIG. 4 is an enlarged view of section A of FIG. 3. In FIG. 4, a vent hole 112 that opens in an oblique direction is formed in the gap between the body front cover 104 and the body rear cover 106. The LED 118 emits light 124 through the vent hole 112 to the outside of the edge of the body rear cover 106 on the ceiling 200. Thereby, it becomes possible for installation personnel or the like of the monitoring camera 100 to perceive indirect light 126 of the light 124, which is emitted to the outside of the edge of the body rear cover 106 on the ceiling 200.

Now, returning to FIG. 3, screws 202 and 204 are inserted into the screw inserting holes 108 of the body rear cover 106. The monitoring camera 100 is fixed onto the ceiling 200 by these screws 202, 204. Here, the ceiling 200 serves as a mounting surface of the monitoring camera 100.

Furthermore, the monitoring camera 100 is connected to an external device 300 via, for example, a cable 122 for network connection. The monitoring camera 100 and the external device 300 can perform bidirectional communication using LAN or Ethernet (registered trademark), for example.

According to the first embodiment of the present invention, for example, the light 124 of the LED 118 whose light-emitting state is associated with the operation state of the monitoring camera 100 is emitted to the outside of the edge of the body rear cover 106 on the ceiling 200. Thereby, installation personnel or the like of the monitoring camera 100 may grasp the operation state of the monitoring camera by perceiving the indirect light 126 of the light 124 emitted to the outside of the edge of the body rear cover on the ceiling 200. Therefore, the installation personnel or the like do not have to remove the body front cover 104 of the monitoring camera 100 in order to verify the light-emitting states of the LEDs 118, 120 and may easily verify the operation state of the monitoring camera 100.

The body of the monitoring camera 100 may have an inexpensive structure, because a light guide tube or the like does not have to be used in order to allow the light-emitting states of the LEDs 118, 120 to be verified from outside of the monitoring camera 100.

Furthermore, the design of the body of the monitoring camera 100 is not disfigured, because a peephole for verification of the light-emitting states of the LEDs 118, 120 does not have to be formed on the body front cover 104 of the monitoring camera 100 in order to allow the light-emitting states of the LEDs 118, 120 to be verified from outside of the monitoring camera 100.

As described above, according to the first embodiment of the present invention, it is possible to allow a caretaker or the like to easily grasp the operation state of the monitoring camera 100, by providing the monitoring camera 100 having an inexpensive structure and whose design is not disfigured.

Moreover, in the first embodiment of the present invention above, the light 124 emitted by the LED 118 and the light emitted by the LED 120 may differ in color. For example, the LED 118 emits the light 124 in green while the LED 120 emits the light in orange. This allows the caretaker or the like of the monitoring camera 100 to grasp correctly the operation state of the monitoring camera 100.

Further, in the first embodiment of the present invention above, the turn-on state and the turn-off state are set as the light-emitting states of the LEDs 118, 120, but a blinking state and the like may also be set in accordance with various operation states of the monitoring camera 100.

Furthermore, in the first embodiment of the present invention above, the LED 118 or 120 emits light through a vent hole 112, but when a hole, other than the vent hole 112, is provided through which light is emitted to the outside of the edge of the body rear cover 106 on the ceiling 200, then such hole may also be used.

Furthermore, in the first embodiment of the present invention above, two LEDs are used, but one or two or more LEDs may also be used.

[Configuration Example of Monitoring Camera]

Figure 5:
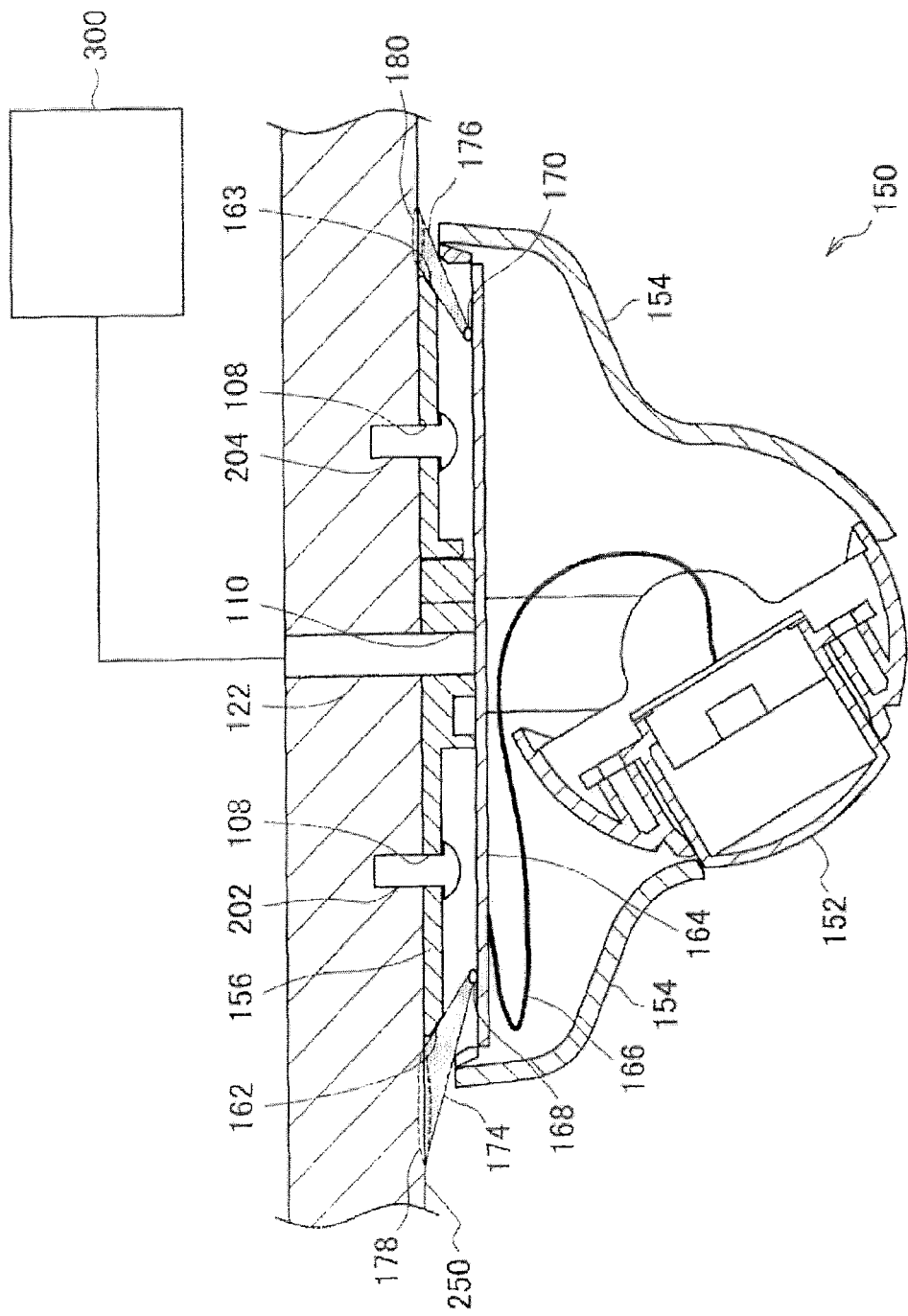
FIG. 5 is a cross-sectional view illustrating a schematic configuration of the monitoring camera according to a second embodiment of the present invention.

Hereafter, a monitoring camera according to the second embodiment of the present invention will be explained. The monitoring camera according to the second embodiment of the present invention differs from the monitoring camera according to the first embodiment of the present invention above in that vent holes with different hole diameters are formed on the monitoring camera. Hereafter, with respect to the monitoring camera according to the second embodiment of the present invention, explanation will be made mainly on differences with the monitoring camera according to the first embodiment of the present invention. Detailed explanation on the configuration identical with that of the monitoring camera according to the first embodiment will be omitted. FIG. 5 is a cross-sectional view illustrating a schematic configuration of the monitoring camera according to the second embodiment of the present invention.

In FIG. 5, a monitoring camera 150 is placed on a ceiling 250 of a room. The monitoring camera 150 mainly includes a camera module 152, a body front cover 154, a body rear cover 156, a board 164, a cable 166, and LEDs 168, 170. The camera module 152 and the board 164 are connected with each other via the cable 166.

The board 164 is substantially disc-shaped and is disposed in an internal space defined by the body front cover 154 and the body rear cover 156, in parallel to the body rear cover 156. The LED 168 is placed in proximity to the edge on the board 164 on the left side in the figure, while the LED 170 is placed in proximity to the edge on the board 164 on the right side in the figure. The light-emitting states of the LEDs 168, 170 are controlled by being associated with the operation state of the monitoring camera 150.

A vent hole 162 that opens in an oblique direction is formed in a gap between the body front cover 154 and the body rear cover 156 on the left side in the figure. Also, a vent hole 163 that opens in an oblique direction is formed in a gap between the body front cover 154 and the body rear cover 156 on the right side in the figure. Besides, the vent hole 162 is formed in such a manner that the hole diameter of the vent hole 162 is larger than that of the vent hole 163. The LED 168 emits light 174 through the vent hole 162 to the outside of the edge of the body rear cover 156 on the ceiling 250 on the left side in the figure. Furthermore, the LED 170 emits light 176 through the vent hole 163 to the outside of the edge of the body rear cover 156 on the ceiling 250 on the right side in the figure. Since the hole diameter of the vent hole 162 is larger than that of the vent hole 163, the size of indirect light 178 of the light 174 is greater than that of indirect light 180 of the light 176.

According to the second embodiment of the present invention, the light 174 of the LED 168 whose light-emitting state is associated with the operation state of the monitoring camera 150 is emitted through the vent hole 162 to the outside of the edge of the body rear cover 156 on the ceiling 250. Furthermore, the light 176 of the LED 170 whose light-emitting state is associated with the operation state of the monitoring camera 150 is emitted through the vent hole 163 to the outside of the edge of the body rear cover 156 on the ceiling 250. Since the hole diameter of the vent hole 162 is larger than that of the vent hole 163, the size of the indirect light 178 of the light 174 is greater than the indirect light 180 of the light 176. Thus, installation personnel or the like of the monitoring camera 100 can easily understand whether the LEDs 168 is emitting light 174, or the LED 170 is emitting light 176 based on the sizes of the indirect lights 178, 180 of the lights 174, 176, which are emitted to the outside of the edges of the body rear cover 156 on the ceiling 250. Hence, it is possible to easily grasp the operation state of the monitoring camera 150.

It should be understood by those skilled in the art that various modifications, combinations, sub-combinations and alterations may occur depending on design requirements and other factors insofar as they are within the scope of the appended claims or the equivalents thereof.

In the respective embodiments above, for example, it is the LED that emits light, but the present invention is not limited thereto. For example, any device that is capable of emitting light may be used.

Furthermore, in each of the embodiments above, a case where the present invention is applied to a monitoring camera as a monitoring apparatus has been described. However, the present invention can be applied to an alarm apparatus such as an alarm generator.

The present application contains subject matter related to that disclosed in Japanese Priority Patent Application JP 2009-242703 filed in the Japan Patent Office on Oct. 21, 2009, the entire content of which is hereby incorporated by reference.

What is claimed is:

1. A monitoring apparatus comprising:
  a front cover;
  an imaging device that is accommodated in the front cover and captures a subject image;
  a rear cover to be fixed onto a mounting surface on which the monitoring apparatus is mounted; and
  an emitting unit that aims emitted light toward an outside edge of the rear cover directly onto the mounting surface,
  wherein a light-emitting state of the light emitted by the emitting unit is associated with an operation state of the monitoring apparatus.

2. The monitoring apparatus according to claim 1,
  wherein the light emitted by the emitting unit is emitted to the mounting surface through a vent hole that is formed in a gap between the front cover and the rear cover.

3. The monitoring apparatus according to claim 1,
  wherein the periphery of the rear cover is located within the side of the front cover.

4. The monitoring apparatus according to claim 1, further comprising another emitting unit that emits light toward the mounting surface.

5. The monitoring apparatus according to claim 4,
  wherein the light emitted by such other emitting unit is emitted to the mounting surface through another vent hole that is formed in a gap between the front cover and the rear cover.

6. The monitoring apparatus according to claim 5,
  wherein the hole diameter of the vent hole and the hole diameter of such other vent hole have different sizes.

* * * * *